United States Patent Office 3,657,289
Patented Apr. 18, 1972

3,657,289
1α-METHYL-2-FORMYL-5α-ANDROST-2-EN-17-ONE AND DERIVATIVES
Paul D. Klimstra, Northbrook, Ill., assignor to
G. D. Searle & Co., Chicago, Ill.
No Drawing. Filed Mar. 29, 1971, Ser. No. 129,115
Int. Cl. C07c *169/20*
U.S. Cl. 260—397.3                                7 Claims

ABSTRACT OF THE DISCLOSURE

1α-methyl-2-formyl-5α-androst-2-en-17-one and its derivatives are produced from the appropriate 1α-methyl-17β-hydroxy-17α-(optionally alkylated)-5α-androstan-3-ones and are valuable pharmacological agents as is evidenced by their anti-estrogenic, androgenic and anabolic activities.

---

The novel compounds of the present invention relate generally to steroids of the androstane family. More specifically, this invention relates to 1α-methyl-2-formyl-5α-androst-2-en-17-one and its derivatives, which compounds are illustrated by the structural formula below

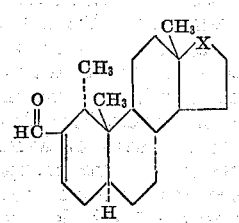

wherein X is a carbonyl radical or a radical of the structural formlua

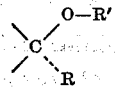

with R being hydrogen or a lower alkyl radical and R' being hydrogen or a lower alkanoyl radical.

The lower alkyl radicals represented by the above formula are methyl, ethyl, propyl, butyl, pentyl, hexyl, heptyl and the branched-chain isomers thereof. The lower alkanoyl radicals intended are illustrated by formyl, acetyl, propionyl, butyryl, pentanoyl, hexanoyl, heptanoyl and the corresponding branched-chain isomers.

The novel compounds of this invention are preferably prepared by a sequence of reactions starting with compounds of the 17β-hydroxy-17α-(optionally alkylated)-1α-methyl-5α-androstan-3-one family. The method of manufacturing these starting compounds is described in Chem. and Pharm. Bull. Japan, 10, 386 (1962). Contacting the appropriate starting compound with a strong base, such as sodium hydride, in the presence of an appropriate ester, such as ethyl formate, yields the corresponding sodium enolate which subsequently is converted to the enol by the addition of an aqueous mineral acid. For example, 17β-hydroxy-1α-methyl-5α-androstan-3-one, when contacted with sodium hydride and ethyl formate and then treated with aqueous hydrochloric acid, is converted to 17β-hydroxy-1α-methyl-2-hydroxymethylen-5α-androstan-3-one. The enol then is condensed in a basic medium, as for example with N-methylaniline in methanol, to yield the N-methylanilinomethylene substituted condensation product. This type of reaction is illustrated by the reaction of 17β-hydroxy-1α-methyl-2-hydroxymethylen-5α-androstan-3-one with N-methylaniline in methanol, thus affording 17β-hydroxy-1α-methyl-2-(N-methylanilinomethylen)-5α-androstan-3-one. Reduction of the 3-oxo substituent to the 3-hydroxy substituent is conveniently accomplished with a metallic hydride. For example, treating the aforementioned intermediate, 17β-hydroxy-1α-methyl-2-(N-methylanilinomethylen)-5α-androstan-3-one, with sodium borohydride in methanol produces 1α-methyl-2-(N-methylanilinomethylen)-5α-androstane-3,17β-diol. The diol then is converted to the 2-formyl-Δ²-17β-ol derivative with methanolic hydrogen chloride. Typically, 1α-methyl-2-(N-methylanilinomethylen)-5α-androstane-3,17β-diol is contacted with hydrochloric acid in methanol to yield 1α-methyl-2-formyl-5α-androst-2-en-17β-ol. Additional products of the latter reaction are 1α-methyl-17α-(optionally alkylated)-2-methylen-5α-androstane-3,17β-diols which are valuable intermediates for the production of other pharmacological agents.

Acylation of the 1α-methyl-17α-(optionally alkylated)-2-formyl-5α-androst-2-en-17β-ol with an acid anhydride produces the 17β-alkanoyl derivative. Acylation of the tertiary alcohol preferably is accomplished under reflux conditions. The manufacture of the 17-ketone is accomplished by oxidation of 17β-ol with chromic acid. For example, when 1α-methyl-2-formyl-5α-androst-2-en-17β-ol is reacted with acetic anhydride in pyridine or with chromic acid, there is produced respectively 1α-methyl-2-formyl-5α-androst-2-en-17β-ol 17-acetate and 1α-methyl-2-formyl-5α-androst-2-en-17-one.

The compounds of this invention exhibit useful pharmacological, e.g. anti-estrogenic, androgenic and anabolic, activity. The anti-estrogenic activity is determined by an assay procedure described in U.S. Pat. 3,539,558 and the anabolic and androgenic activity is determined by the procedure described in U.S. Pat. 3,501,504.

The invention will appear more fully from the examples which follow. These examples should not be construed as limiting the invention either in spirit or in scope as numerous modifications both in materials and methods will be apparent to those skilled in the art. Quantities of material are presented in parts by weight unless otherwise noted and temperatures are given in degrees centigrade (° C.).

EXAMPLE 1

To a solution of 18 parts of 17β-hydroxy-1α-methyl-5α-androstan-3-one in 527 parts of benzene is added 33.2 parts of ethyl formate in one portion. That solution is stirred under a nitrogen atmosphere and 22.5 parts of a 50% sodium hydride in oil dispersion is added over a 5 minute period. The stirring is continued for 22 hours at room temperature, and then the solid material is removed by filtration, washed successively with benzene and hexane, and dried under reduced pressure at a temperature of about 60°. The solid is added to 142 parts of hydrochloric acid in 600 parts of water with rapid stirring continuing for a period of about 15 minutes, thus forming a dark, highly viscous material, which is separated by decantation. This material is dissolved in ethyl acetate, and that solution is filtered throguh diatomaceous earth. The filtrate is washed with water and dried over anhydrous sodium sulfate and charcoal, and the solvent is removed yielding 17β-hydroxy-1α-methyl-2-hydroxymethylen-5α-androstan-3-one as an oil.

EXAMPLE 2

A solution of 16 parts of 17β-hydroxy-1α-methyl-2-hydroxymethylen-5α-androstan-3-one, 15.8 parts of freshly distilled N-methylaniline and 317 parts of methanol is refluxed for 4 hours. Then the solvent is removed under reduced pressure, thus affording 17β-hydroxy-1α-methyl-2-(N-methylanilinomethylen)-5α-androstan-3-one as an oil.

EXAMPLE 3

To 16 parts of 17β-hydroxy-1α-methyl-2-(N-methylanilinomethylen)-5α-androstan-3-one dissolved in 317 parts of methanol is added, with stirring and cooling in a water bath, a solution of 15 parts of sodium borohydride in 50 parts of water. Stirring is continued for about 3 hours, and then water is added. The solution is extracted with ether and the extracts are washed with water and dried over anhydrous sodium sulfate and charcoal. After solvent removal, 1α-methyl-2-(N-methylanilinomethylen)-5α-androstane-3,17β-diol remains as an oil.

EXAMPLE 4

A solution of 16 parts of 1α-methyl-2-(N-methylanilinomethylen)-5α-androstane-3,17β-diol and 317 parts of methanol is treated with 29.6 parts of hydrochloric acid. The solution is stirred for ½ hour and kept at room temperature by the addition of water. Additional water is added and then the solution is extracted with ether. The extracts are washed successively with water and a 5% sodium bicarbonate solution and dried over anhydrous sodium sulfate and charcoal to yield, after solvent removal, a glass-like material. This material is taken up in benzene and chromatographed on a silica column to yield, after elution with ethyl acetate-benzene solution, pure 1α-methyl-2-formyl-5α-androst-2-en-17β-ol. This compound displays a melting point at about 161–163° and an ultraviolet absorption band at 231 millimicrons with a molecular extinction coefficient of about 13,000. This compound further is represented by the following structural formula

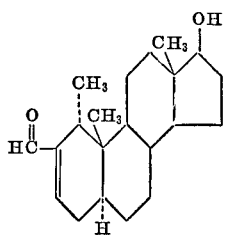

Also afforded in the above chromatographic fractionation is a mixture of 1α-methyl-2-methylen-5α-androstane-3α,17β-diol and 1α-methyl-2-methylen-5α-androstane-3β,17β-diol. These compounds are valuable pharmacological, e.g. estrogenic and anti-fungal, agents.

EXAMPLE 5

A solution of 0.5 part of 1α-methyl-2-formyl-5α-androst-2-en-17β-ol, 5.5 parts of acetic anhydride, and 9.8 parts of pyridine is allowed to stand at room temperature for 48 hours. At the end of that time, methanol and water are added and the solution is cooled to effect crystallization. The crystals are collected, washed with water and dried in air to yield pure 1α-methyl-2-formyl-5α-androst-2-en-17β-ol 17-acetate which exhibits an ultraviolet maximum at about 231 millimicrons and a molecular extinction coefficient of about 12,600. This compound is represented by the following structural formula

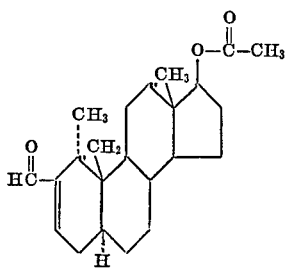

EXAMPLE 6

When an equivalent quantity of propionic anhydride is substituted in the procedure of Example 5, there is obtained 1α-methyl-2-formyl-5α-androst-2-en-17β-ol 17 propionate.

EXAMPLE 7

To 0.3 part of 1α-methyl-2-formyl-5α-androst-2-en-17β-ol in 4 parts of acetone is added, dropwise with stirring, an excess of 4 N aqueous chromic acid. The excess acid then is destroyed by the addition of isopropyl alcohol and the solution is filtered through diatomaceous earth. The solution volume is reduced by solvent evaporation under a nitrogen atmosphere, and water is added to make the solution turbid. This mixture is cooled to yield, upon crystallization, 1α-methyl-2-formyl-5α-androst-2-en-17-one having the following structural formula

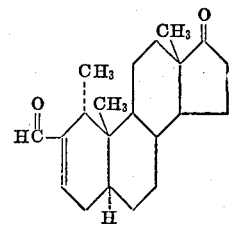

EXAMPLE 8

A stirred solution of 18 parts of 17β-hydroxy-1α,17α-dimethyl-5α-androstan-3-one and 527 parts of benzene is treated with 33.2 parts of ethyl formate, which is added in one portion, and 22.5 parts of a 50% sodium hydride in oil dispersion, which is added over a 5 minute period under a nitrogen atmosphere. The mixture is continuously stirred at room temperature for 22 hours. The resultant sodium salt which forms is separated by filtration, washed with benzene and then hexane and dried at 50° under reduced pressure for 3 hours. The salt then is added to a stirred solution of 142 parts of hydrochloric acid and 1200 parts of water, and the precipitate is collected, washed with water and air dried, thus yielding 17β-hydroxy-1α,17α-dimethyl-2-hydroxymethylen-5α-androstan-3-one. This compound is characterized by an ultraviolet absorption band at 286 millimicrons with a molecular extinction coefficient of 4200.

EXAMPLE 9

A solution of 18 parts of 17β-hydroxy-1α,17α-dimethyl-2-hydroxymethylen-5α-androstan-3-one, 396 parts of methanol and 17.7 parts of freshly distilled N-methylaniline is refluxed for 5 hours. The solution is cooled and the solvent is removed to produce crude 17β-hydroxy-1α,17α-dimethyl-2-(N-methylanilinomethylen) - 5α - androstan-3-one.

18 parts of the above crude product is dissolved in 356 parts of methanol, and to this solution is added, over a period of about 25 minutes with stirring and with cooling in a cold water bath, 18 parts of sodium borohydride dissolved in 50 parts of water. The solution is stirred at room temperature for an additional 2½ hours and water is added. Then the solution is extracted with ether and the extracts washed with water and dried over anhydrous sodium sulfate and charcoal. After solvent removal, 1α,17α-dimethyl-2-(N-methylanilinomethylen) - 5α - androstane-3,17β-diol remains as an oil.

EXAMPLE 10

To 18 parts of 1α,17α-dimethyl-2-(N-methylanilinomethylen)-5α-androstane-3,17β-diol in 317 parts of methanol, cooled in a water bath is added, dropwise over a 5 minute period and accompanied by stirring, 23.7 parts of hydrochloric acid. The solution is stirred for about 10 minutes. Then water is added and the solution extracted with ether. The extracts are washed with water and a 5% sodium bicarbonate solution and dried over anhydrous sodium sulfate. Solvent is removed to leave an oil, which when taken up in benzene and chromatographed on silicon dioxide, yields 1α,17α-dimethyl-2-formyl-5α-androst-2-en-17β-ol as an oil. The pure material is obtained after recrystallization from a methanol-water solution and is characterized by an ultraviolet absorption band at about 231 millimicrons with a molecular extinction coefficient of about 8200. This compound is represented by the following structural formula

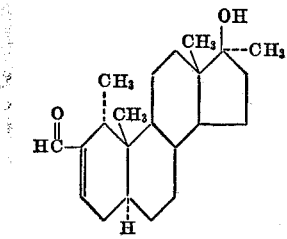

Additional fractions of the chromatographic process yield 1α,17α-dimethyl-2-methylen - 5α - androstane-3β,17β-diol and 1α,17α - dimethyl-2-methylen-5α-androstane-3α,17β-diol as a mixture.

EXAMPLE 11

By substituting an equivalent quantity of 17α-ethyl-17β-hydroxy-1α-methyl-5α-androstan-3-one as a starting material, and otherwise following the procedure of Example 8, Example 9, and Example 10, there is produced 17α-ethyl-1α-methyl-2-formyl-5α-androst-2-en-17β-ol.

What is claimed is:
1. A compound of the formula

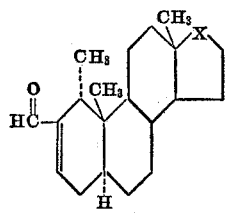

wherein X is selected from the group consisting of a carbonyl radical and radicals of the formula

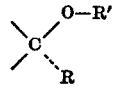

with R selected from the group consisting of hydrogen and lower alkyl radicals and R' selected from the group consisting of hydrogen and lower alkanoyl radicals.

2. As in claim 1, a compound of the formula

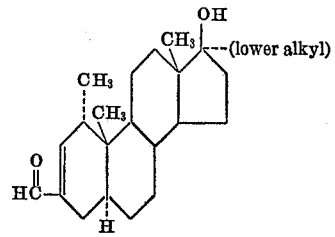

3. As in claim 1, a compound of the formula

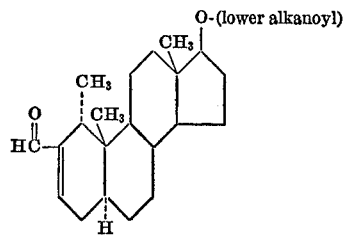

4. As in claim 1, a compound which is 1α-methyl-2-formyl-5α-androst-2-en-17β-ol.

5. As in claim 1, a compound which is 1α-methyl-2-formyl-5α-androst-2-en-17β-ol 17-acetate.

6. As in claim 1, a compound which is 1α-methyl-2-formyl-5α-androst-2-en-17-one.

7. As in claim 1, a compound which is 1α,17α-dimethyl-2-formyl-5α-androst-2-en-17β-ol.

References Cited

Orr et al.: J. Med. Chem. 6, p. 166–73 (1963).
Counsell et al.: J. Med. Chem. 6, pp. 736–38 (1963).

HENRY A. FRENCH, Primary Examiner

U.S. Cl. X.R.
260—397.4, 999